(No Model.)
W. H. KIDD.
SAW HANDLE.
No. 472,890.  Patented Apr. 12, 1892.
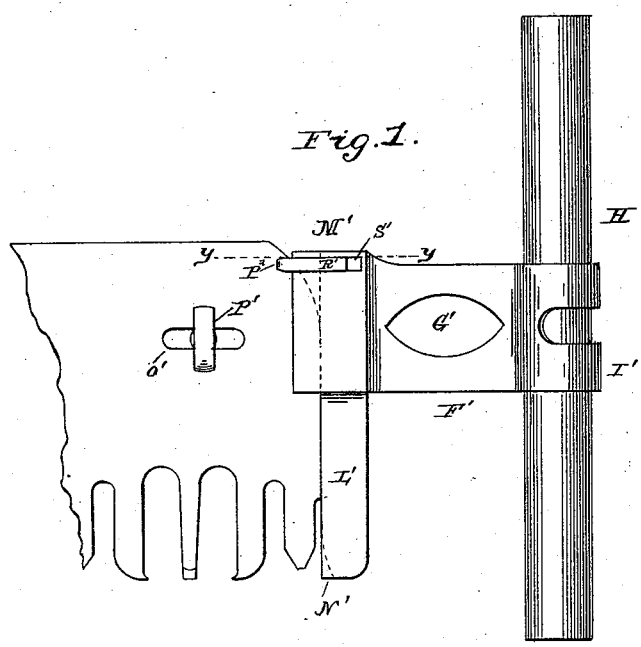
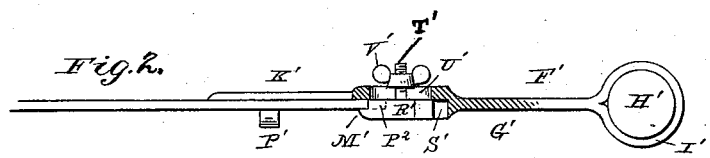
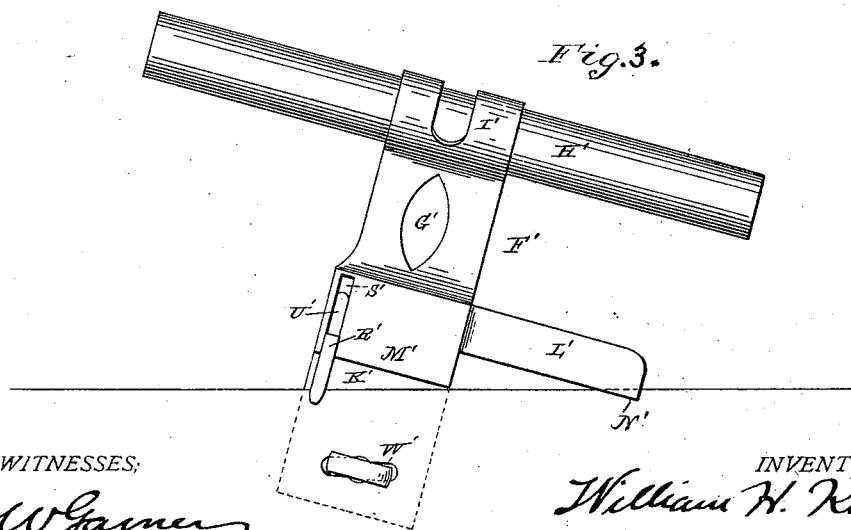
WITNESSES:  INVENTOR,
J. W. Gamer  William H. Kidd
James R. Clement  BY
  Freeman & Money
  ATTORNEYS

UNITED STATES PATENT OFFICE.

WILLIAM HENRY KIDD, OF SANTA ROSA, CALIFORNIA.

SAW-HANDLE.

SPECIFICATION forming part of Letters Patent No. 472,890, dated April 12, 1892.

Application filed November 25, 1890. Serial No. 372,643. (No model.)

*To all whom it may concern:*

Be it known that I, WILLIAM HENRY KIDD, of Santa Rosa, Sonoma county, California, have invented a new and useful Improvement in Saws for Felling Trees; and I do hereby declare the following to be a full, clear, and exact description of the same, which will enable others skilled in the art to which it relates to make and use the invention, reference being had to the accompanying drawings, forming part of this specification.

My invention relates to an improvement in crosscut-saws for felling standing timber; and it consists in the peculiar construction and combination of devices, that will be more fully set forth hereinafter, and particularly pointed out in the claims.

In the accompanying drawings, Figure 1 is a side elevation of part of a saw-blade, showing my improved handle applied thereto. Fig. 2 is an edge view, partly in section, of the parts shown in Fig. 1. Fig. 3 is a side elevation of the handle, adjusted as a hand-hold to carry the saw.

The handle $F'$ consists of a clip $G'$ and a hand-hold $H'$, which passes transversely through an eye $I'$ at the outer end of the clip. The latter is formed of a single piece of metal, has a plate $K'$ to bear against one side of the saw-blade, an arm $L'$ at right angles to the plate to bear against one end of the saw-blade, and at the angle the clip is thickened and provided with a slot $M'$ to receive and retain the end of the saw-blade. The lower end of the arm $L'$ has a slot $N'$ in its inner edge, the bottom of the said slot being inclined and adapted to receive the upper edge of the saw when the handle is used for carrying, as will presently appear. Near the end of the saw-blade and in a slightly-inclined position is an elongated opening $O'$, with its central portion enlarged and circular in shape. A stud $P'$, having a T-head, projects from the inner face of the plate $K'$, and the said stud is adapted to enter the opening $O'$, and when the handle $F'$ is turned to the position shown in Fig. 3 its T-head extends transversely across and beyond the opening and secures the handle to the saw-blade, as will be readily understood. The upper corner of the saw-blade, at the end to which the handle $F'$ is attached, is rounded, as shown, to adapt the handle to be swung thereon, and in the curved edge of the saw-blade is a notch $P^2$. A key $R'$ works in a recess or way $S'$ in the upper side of the clip and has a stem $T'$, which works in an elongated opening $U'$ in the clip. The said key is adapted to enter the notch $P^2$ to secure the handle against movement when attached to the end of the saw-blade, and a set-nut or thumb-nut $V'$ is screwed on the end of the key-stem $T'$ to clamp the key in place, thus preventing the handle from working loose. It will be understood that in order to remove the handle $F'$ it will be only necessary to slip the key and turn the handle to the position shown in Fig. 8, when the T-headed stud will be in position to clear the opening $O'$. Hence the said handle may be removed from the saw-blade in an instant and without the use of a wrench or other device.

Saws of this class, designed for felling large trees, are of considerable length, and being comparatively narrow are very pliable, which makes it awkward and inconvenient to carry one of them from place to place by handles at the extreme ends. To overcome this difficulty, I provide the saw-blade with an opening $W'$, which is exactly similar to the opening $O'$, and locate the said opening $W'$ at a suitable distance from the end or at a point near the center of the saw-blade. When it is desired to carry the saw, the handle $F'$ is disengaged from the end of the blade and is reattached thereto at the locality of the opening $W'$ by causing the T-headed stud to engage the said opening, which arranges the handle $F'$ in an inclined position on the back of the saw-blade, with the notch or slot $N'$ of the arm $L'$ in engagement with the back edge of the blade, as shown in Fig. 3. When thus adjusted, the key is caused to bear upon the back edge of the blade and clamped in position as before, thus retaining the handle in place.

Having thus described my invention, I claim—

1. The saw-blade having the opening $O'$ and the notch $P^2$ in its edge at one end, in combination with the handle having the plate to rest on one side of the blade, the right-angled arm, the T-headed stud in the plate to engage the opening O', and the movable key to engage the notch, whereby the handle may be instantly detached from the end of the blade without the use of a wrench or other tool, substantially as described.

2. The saw-handle comprising the clip having the yoke, the slot to engage the end of the blade, the plate to bear on one side of the blade and provided with the stud to enter an opening in said blade, the said clip being further provided with the right-angled arm to engage the end or back of the blade and having the adjustable key, for the purpose set forth, substantially as described.

In testimony that I claim the foregoing I append my signature.

WILLIAM $\overset{\text{his}}{\times}$ HENRY KIDD.
$\phantom{WILLIAM\ }{}_{\text{mark}}$ Witnesses:
D. R. GALE,
C. A. PAGE,
T. A. FORSYTH.